(12) United States Patent
Aboshi et al.

(10) Patent No.: US 9,182,609 B2
(45) Date of Patent: Nov. 10, 2015

(54) PROJECTION-TYPE DISPLAY APPARATUS

(71) Applicant: JVC KENWOOD CORPORATION, Yokohama-shi, Kanagawa (JP)

(72) Inventors: Kazutaka Aboshi, Yokohama (JP); Motoshi Tohda, Yokohama (JP); Tatsuru Kobayashi, Yokohama (JP)

(73) Assignee: JVC KENWOOD CORPORATION, Yokohama-shi, Kanagawa (JP)

( * ) Notice: Subject to any disclaimer, the term of this patent is extended or adjusted under 35 U.S.C. 154(b) by 0 days.

(21) Appl. No.: 14/337,535

(22) Filed: Jul. 22, 2014

(65) Prior Publication Data

US 2014/0333902 A1    Nov. 13, 2014

Related U.S. Application Data

(63) Continuation of application No. PCT/JP2012/079394, filed on Nov. 13, 2012.

(30) Foreign Application Priority Data

Jan. 26, 2012    (JP) .................................. 2012-013803

(51) Int. Cl.
*G03B 21/00*    (2006.01)
*G02B 27/48*    (2006.01)
(Continued)

(52) U.S. Cl.
CPC .............. *G02B 27/48* (2013.01); *G02B 26/101* (2013.01); *G02B 26/108* (2013.01);
(Continued)

(58) Field of Classification Search
CPC ...... G03B 21/00; G03B 21/14; H04N 9/3141; H04N 9/3197

USPC .................. 353/31, 33, 37, 94, 98, 99, 102; 359/489.09, 638, 640, 511, 599, 619; 362/284, 268, 271, 311.06
See application file for complete search history.

(56) References Cited

U.S. PATENT DOCUMENTS 7,206,133 B2 *    4/2007    Cassarly et al. .............. 359/630
2003/0039036 A1 *    2/2003    Kruschwitz et al. .......... 359/707
(Continued)

FOREIGN PATENT DOCUMENTS

JP    2003098476 A    4/2003
JP    2008256824 A    10/2008
(Continued)

OTHER PUBLICATIONS

International Search Report dated Feb. 12, 2013 in reference to application No. PCT/JP2012/079394.
(Continued)

*Primary Examiner* — Sultan Chowdhury
(74) *Attorney, Agent, or Firm* — Nath Goldberg & Meyer; Jerald L. Meyer; Christopher Thomas

(57) ABSTRACT

An integrator includes a plurality of rectangular lens cells arranged in a direction x and a direction y. Laser light emitted from a laser source is projected onto an integrator. A beam irradiation position moving unit is configured to cause the laser light to scan the surface of the integrator in the directions x and y so that the laser light is sequentially projected onto a plurality of lens cells. A reflective liquid crystal device is configured to modulate the laser light emitted from the integrator. A projection lens is configured to project the laser light modulated by the reflective liquid crystal device.

3 Claims, 15 Drawing Sheets

(51) Int. Cl.
  *G02B 26/10* (2006.01)
  *G02B 27/10* (2006.01)
  *G03B 21/20* (2006.01)
  *H04N 9/31* (2006.01)

(52) U.S. Cl.
  CPC ......... *G02B 27/1033* (2013.01); *G03B 21/208* (2013.01); *G03B 21/2033* (2013.01); *H04N 9/3105* (2013.01); *H04N 9/3111* (2013.01); *H04N 9/3129* (2013.01); *H04N 9/3152* (2013.01); *H04N 9/3161* (2013.01); *H04N 9/3197* (2013.01)

(56) References Cited

U.S. PATENT DOCUMENTS

| | | | | |
|---|---|---|---|---|
| 2005/0018309 | A1* | 1/2005 | McGuire et al. | 359/630 |
| 2009/0016061 | A1* | 1/2009 | Chen et al. | 362/284 |
| 2010/0171902 | A1* | 7/2010 | Hsieh et al. | 349/62 |
| 2010/0306022 | A1* | 12/2010 | Plut | 705/10 |
| 2010/0321596 | A1* | 12/2010 | Ishikura | 349/5 |
| 2014/0028985 | A1* | 1/2014 | Janssens | 353/31 |

FOREIGN PATENT DOCUMENTS

| | | |
|---|---|---|
| JP | 2009169012 A | 7/2009 |
| JP | 4688980 B1 | 5/2011 |
| JP | 2012237813 A | 12/2012 |
| WO | 2005073798 A1 | 8/2005 |
| WO | 2006137326 A1 | 12/2006 |
| WO | 2008114502 A1 | 9/2008 |
| WO | 2011092843 A1 | 8/2011 |

OTHER PUBLICATIONS

Official Action dated Jul. 28, 2015 corresponding to Japanese application No. 2012-013803.

* cited by examiner

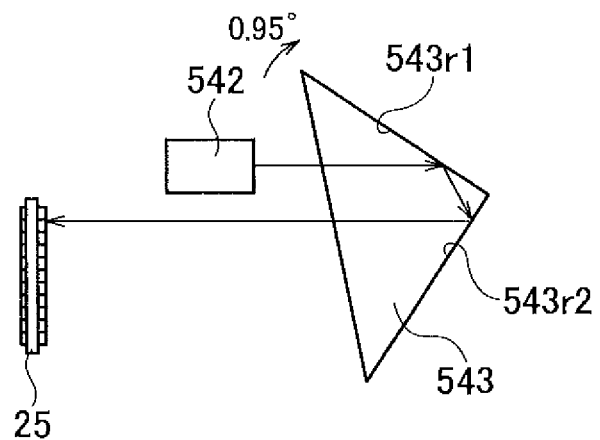
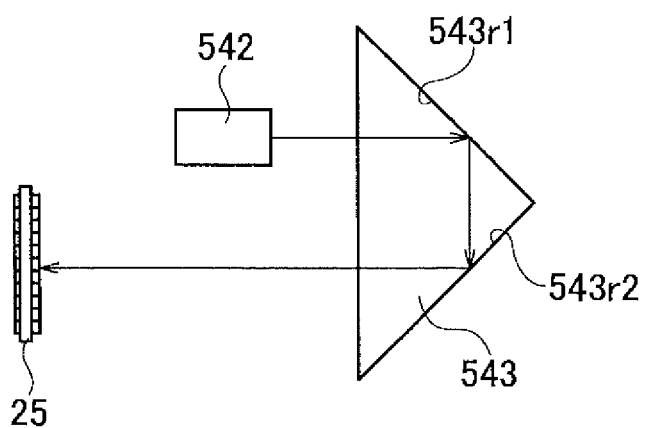
FIG. 8

PROJECTION-TYPE DISPLAY APPARATUS

CROSS REFERENCE TO RELATED APPLICATION

This application is a Continuation of PCT Application No. PCT/JP2012/079394, filed on Nov. 13, 2012, and claims the priority of Japanese Patent Application No. 2012-013803, filed on Jan. 26, 2012, the entire contents of all of which are incorporated herein by reference.

BACKGROUND

The present disclosure relates to a projection-type display apparatus including a laser light source.

In recent years, there has been an increasing demand for miniaturization of projection-type display apparatuses. The projection-type display apparatuses can be miniaturized by using semiconductor laser light sources (hereinafter, referred to as just a laser light source) instead of xenon lamps and ultrahigh pressure mercury lamps, which are conventionally used.

However, the laser light sources have low light emission efficiency and high coherence to be used as the light sources of the projection-type display apparatuses. Especially, the high coherence thereof in particular, produces an interference pattern called speckle, and worsens the quality of projected images.

In order to solve this problem, various proposals have been made. Japanese Patent Laid-open Publication No. 2009-169012 (Patent Literature 1) describes that continuous rotation of a prism or a mirror reduces speckle. Japanese Patent Laid-open Publication No. 2008-256824 (Patent Literature 2) describes that translating a reflection plate in a reciprocating manner reduces speckle.

SUMMARY

The configurations described in Patent Literatures 1 and 2 provide insufficient effects on reducing speckle, and there is a demand for a configuration capable of reducing speckle more effectively.

An object of the embodiments is to provide a projection-type display apparatus capable of reducing speckle more effectively.

An aspect of the embodiments provides a projection-type display apparatus comprising; a laser source; an integrator which includes a plurality of rectangular lens cells arranged in a first direction and a second direction and is irradiated by laser light emitted from the laser source; a beam irradiation position moving unit configured to cause the laser light emitted from the laser light source to scan the surface of the integrator in the first and second directions so that the laser light is sequentially projected onto the plurality of lens cells; a modulation device configured to modulate the laser light emitted from the integrator; and a projection lens configured to project the laser light modulated by the modulation device.

BRIEF DESCRIPTION OF THE DRAWINGS

FIG. 7 is a plan view for explaining the movement of the prism 543 in FIGS. 1 and 2.

FIG. 8 is a plan view for explaining the movement of the prism 543 in FIGS. 1 and 2.

DETAILED DESCRIPTION

Hereinafter, a description is given of a projection-type display apparatus of each embodiment with reference to the accompanying drawings.

First Embodiment

Figure 1:
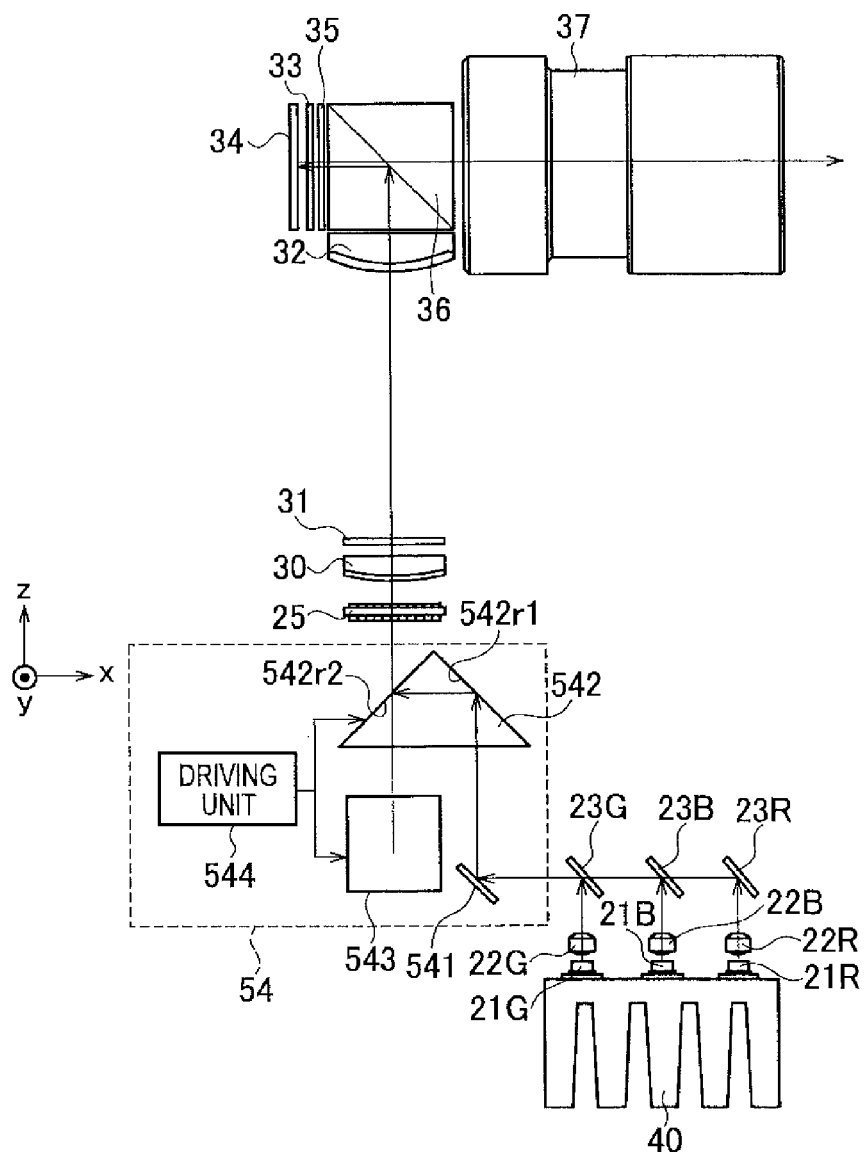
FIG. 1 is a configuration diagram illustrating a projection-type display apparatus of a first embodiment.

In FIG. 1, laser light sources 21R, 21G, and 21B, which are composed of laser diodes, are attached to a heat sink 40. The laser light sources 21R, 21G, and 21B emit red, green, and blue light, respectively. Collimator lenses 22R, 22G, and 22B collimate the incident red, green, and blue light to approximately collimated light, respectively.

A mirror 23R reflects the red light emitted from the collimator lens 22R to fold the optical path thereof by 90°. A dichroic mirror 23B transmits the red light and reflects the blue light emitted from the collimator lens 22B to fold the optical path thereof by 90°.

A dichroic mirror 23G transmits the red and blue light and reflects the green light emitted from the collimator lens 22G to fold the optical path thereof by 90°. The laser light sources 21R, 21G, and 21B sequentially emit light in a time-division manner at regular time intervals. The optical paths of the red, green, and blue light are thereby integrated into one.

The red, green, and blue light is individually incident on a beam irradiation position moving unit 54. The beam irradiation position moving unit 54 includes a mirror 541, prisms 542 and 543, and a driving unit 544 driving the prisms 542 and 543. On the inner faces of the prism 542, reflection coatings 542r1 and 542r2 are formed.

Herein, the driving unit 544 drives both the prisms 542 and 543 in the drawing. However, the driving unit to drive the prism 542 may be separately provided from the driving unit to drive the prism 543. The operation of the beam irradiation position moving unit 54 is described later.

The red, green, and blue light emitted from the beam irradiation position moving unit 54 is incident on an integrator 25 composed of a fly-eye lens. The integrator 25 of the first embodiment includes a plurality of fine lens cells arranged in the directions x and y on both sides of the integrator 25. The integrator 25 can be configured in such a manner that a plurality of lens cells is formed on both sides of an approximately 1 mm thick sheet of a resin material, for example.

The beam of red, green, and blue light incident on the integrator 25 is circular, and the circular beam is incident on one of the cells. The red, green, and blue light emitted from each cell of the integrator 25 is incident on a field lens 30.

In the first embodiment, the integrator 25 is used for the purpose of miniaturization of the projection-type display apparatus. When the cells of the integrator 25 are miniaturized to minimize the focal distance of the lens composed of each cell, the focal distance of the field lens 30 can also be set short. This can shorten the optical path length and can therefore reduce the capacity of the optical system.

The red, green, and blue light is collected by the field lens 30 so that the light transmitted through each cell of the integrator 25 is projected onto the reflective liquid crystal device 34. The polarization of the red, green, and blue light emitted from the field lens 30 is equally adjusted by the polarization plate 31. The red, green, and blue light is equally S-polarized in the first embodiment.

The S-polarized component of the red, green, and blue light passes through the field lens 32 and is reflected on the joint plane of the PBS 36 with the optical path folded by 90°. On the joint plane of the PBS 36, dichroic film configured to reflect S-polarized components and transmit P-polarized components is formed. The S-polarized components pass through a quarter wavelength plate 35 and a phase compensator 33 and are incident on the reflective crystal liquid device 34.

Since the laser light sources 21R, 21G, and 21B sequentially emit light in a time-division manner as described above, the S-polarized components of the red, green, and blue light are sequentially incident on the reflective liquid crystal device 34. The S-polarized components of the red, green, and blue light incident on the reflective liquid crystal device 14 are modulated in accordance with the red, green, and blue components of the image signal and are converted into P-polarized components.

The first embodiment is a so-called single-plate projection-type display apparatus including the single reflective liquid crystal device 34, which can be therefore miniaturized.

The P-polarized components of the red, green, and blue light reflected on the reflective liquid crystal device 34 to be emitted pass through the phase compensator 33 and quarter wavelength plate 35 again and are then incident on the PBS 36. The P-polarized components are transmitted through the joint plane of the PBS 36, and the projection lens 37 sequentially projects the red, green, and blue light onto a not-shown screen in the time-division manner.

Figure 2:
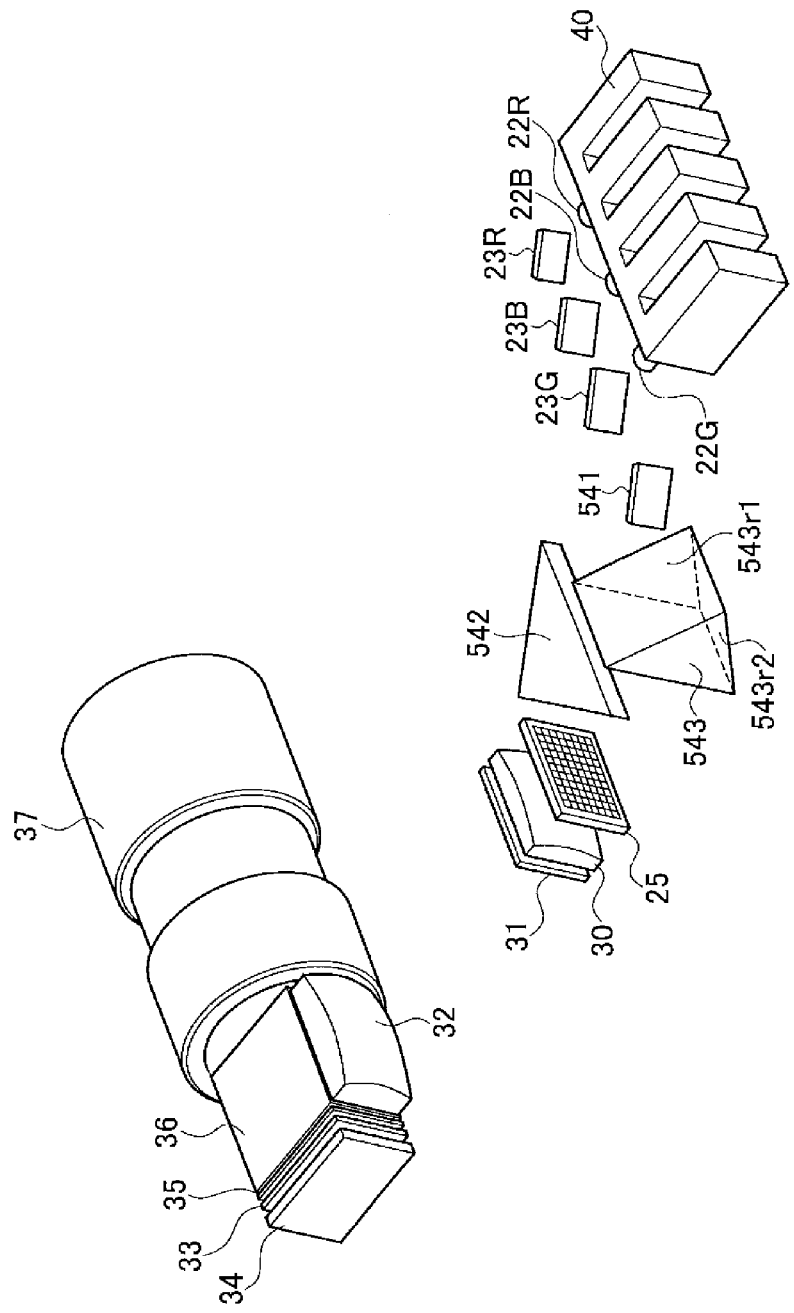
FIG. 2 is an isometric diagram of the first embodiment.

As illustrated in the isometric diagram of FIG. 2, reflection coatings 543r1 and 543r2 are formed on the inner faces of the prism 543. As seen from FIG. 2, the prisms 542 and 543 directly face each other so that the directions thereof are orthogonal to each other. In FIG. 2 and FIGS. 3 to 9 described later, the driving unit 544 is not shown.

Figure 3:
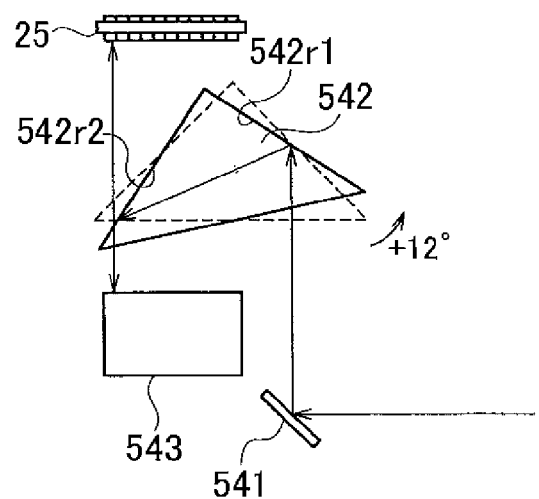
FIG. 3 is a plan view for explaining movement of a prism 542 in FIGS. 1 and 2.

Next, using FIGS. 3 to 9, the operation of the beam irradiation position moving unit 54 is described. FIGS. 3 to 9 show a part of the configuration in FIGS. 1 and 2. As illustrated in FIG. 3, the red, green, and blue light has the optical path thereof folded by 90° by the mirror 541 and is incident on the prism 542.

The red, green, and blue light incident on the prism 542 is reflected on the reflection coatings 542r1 and 542r2 and is incident on the prism 543. The red, green, and blue light incident on the prism 543 is reflected on reflection coatings 543r1 and 543r2, which are not shown in the drawing, and is incident on the integrator 25.

Figure 4:
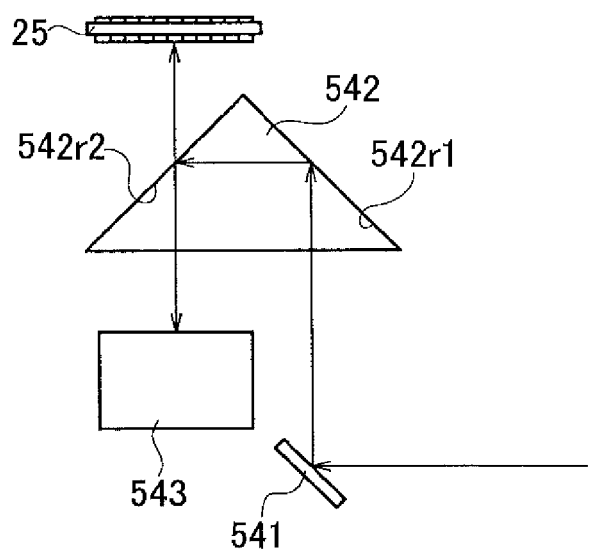
FIG. 4 is a plan view for explaining the movement of the prism 542 in FIGS. 1 and 2.
Figure 5:
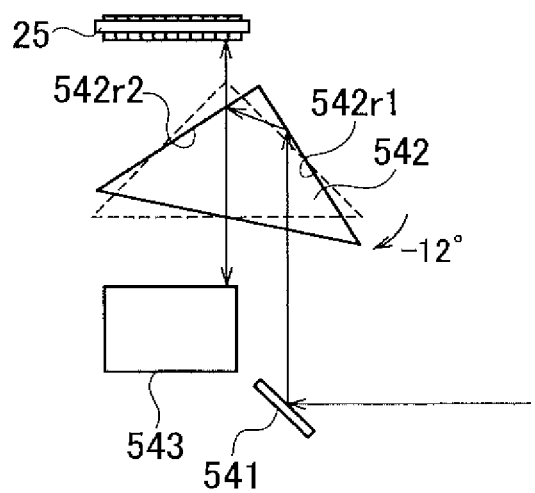
FIG. 5 is a plan view for explaining movement of the prism 542 in FIGS. 1 and 2.

FIG. 3 shows a state where the prism 542 is rotated counterclockwise by 12° from the position indicated by a dashed line to the position indicated by a solid line. In FIGS. 3 to 5, counterclockwise rotation is regarded as + rotation, and clockwise rotation is regarded as − rotation. In this state, the beam of red, green, and blue light emitted from the prism 543 is incident on the left end of the integrator 25 in the direction x. As the prism 542 rotates clockwise, the beam of red, green, and blue light emitted from the prism 543 sequentially moves toward the center of the integrator 25 in the direction x.

FIG. 4 shows a state where the prism 542 is returned to the reference position at 0°, which is indicated by the dashed line in FIG. 3. The beam of red, green, and blue light is incident on the center of the integrator 25 in the direction x.

As the prism 542 further rotates clockwise from the reference position, the beam of red, green, and blue light emitted from the prism 543 sequentially moves on the integrator 25 from the center in the direction x toward the right end.

FIG. 5 shows a state where the prism 542 is rotated clockwise by 12° from the reference position indicated by a dashed line. The beam of red, green, and blue light is incident on the right end of the integrator 25 in the direction x.

In this way, when the prism 542 rotates in a reciprocating manner in a range from +12° to −12°, the beam of red, green, and blue light is projected onto a predetermined position of the integrator 25 in the direction y while reciprocating from the left end to the right end in the direction x.

Figure 6:
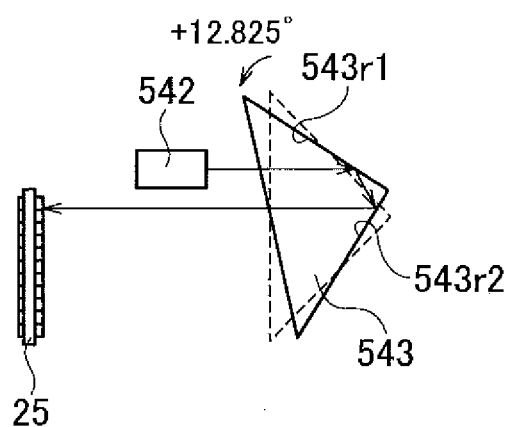
FIG. 6 is a plan view for explaining movement of a prism 543 in FIGS. 1 and 2.

Next, FIG. 6 shows a state where the prism 543 is rotated counterclockwise by 12.825° from the position indicated by a dashed line to the position indicated by a solid line. In FIGS. 6 to 9, the counterclockwise rotation is regarded as + rotation, and the clockwise rotation is regarded as − rotation. In this state, the beam of red, green, and blue light emitted from the prism 543 is incident on a cell positioned at the upper end of the integrator 25 in the direction y (a cell of the first line).

As illustrated in FIG. 7, when the angle of the prism 543 is returned from the state of FIG. 6 by 0.95°, the beam of red, green, and blue light is incident on the cell of the second line of the integrator 25.

As the angle of the prism 543 sequentially returns in increments of 0.95°, the beam of red, green, and blue light sequentially moves from the cell of the first line of the integrator 25 toward the cell positioned at the lower end.

FIG. 8 shows the state where the prism 543 is rotated from +12.825° of FIG. 6 in increments of 0.95° for 13 times. In this state, the beam of red, green, and blue light is incident on the cell of the line just above the center of the integrator 25 in the direction y.

As the prism 543 further rotates clockwise in increments of 0.95°, the beam of red, green, and blue light emitted from the prism 543 sequentially moves toward the cell positioned at the lower end of the integrator 25 in the direction y.

Figure 9:
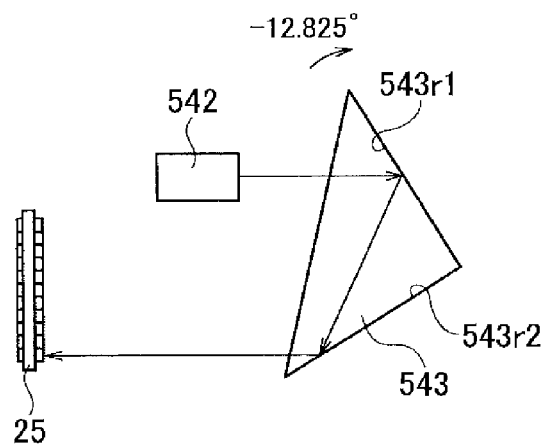
FIG. 9 is a plan view for explaining the movement of the prism 543 in FIGS. 1 and 2.

FIG. 9 shows the state where the prism 543 is rotated clockwise by 12.825° from the reference position indicated by a dashed line in FIG. 6. The beam of red, green, and blue light is incident on the lower end of the integrator 25 in the direction y.

In this way, as the prism 543 rotates in a reciprocating manner in a range from +12.825° to −12.825°, the beam of red, green, and blue light is projected onto a predetermined position of the integrator 25 in the direction x while reciprocating from the upper end to the lower end in the direction y.

The driving unit 544 combines the above-described reciprocating rotation of the prism 542 from +12° to −12° and reciprocating rotation of the prism 543 from +12.825° to −12.825° in the following manner. First, the driving unit 544 holds the prism 543 rotated by 12.825° in the state of FIG. 6 while rotating the prism 542 from +12° to −12°.

The beam of red, green, and blue light is therefore sequentially projected onto the cells of the first line located at the upper end of the integrator 25 in the direction y from the left end to the right end in the direction x.

Subsequently, the driving unit 544 returns the angle of the prism 543 by 0.95° and holds the returned prism 543 while rotating the prism 542 from −12° to +12°. The beam of red, green, and blue light is then sequentially projected onto the cells of the second line of the integrator 25 from the right end to the left end in the direction x.

In a similar manner, by sequentially rotating the angle of the prism 543 in increments of 0.95° while rotating the prism 542 from +12° to −12° or from −12° to +12°, the beam of red, green, and blue light can be projected onto the cells of each line of the integrator 25 from the left end to the right end or from the right end to the left end.

Figure 10:
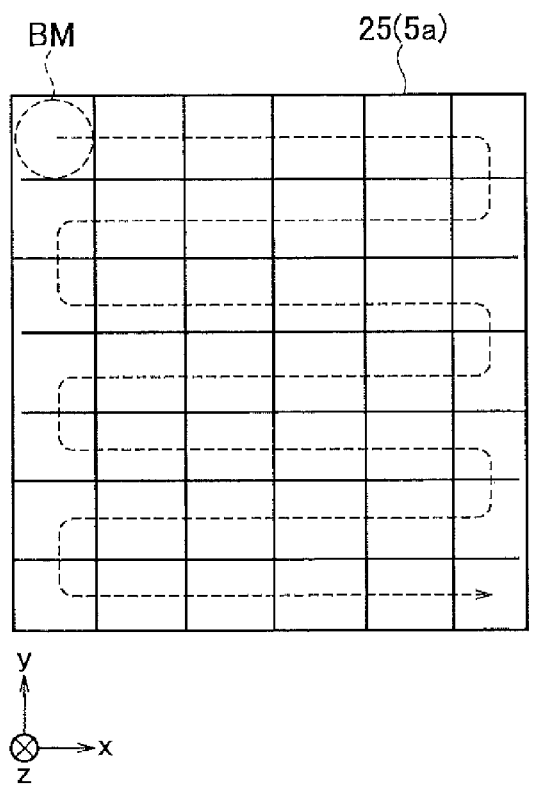
FIG. 10 is a diagram for explaining scanning by a beam BM on an integrator 25 or 5a in each embodiment.

By combining the continuous reciprocating rotation of the prism 542 and the rotation of the prism 543 in increments of 0.95° as described above, the beam BM can scan the integrator 25 in the horizontal and vertical directions as illustrated in FIG. 10. The beam BM can be therefore sequentially projected onto every cell of the integrator 25.

While the integrator 25 includes fine cells as described above, each cell illustrated in FIG. 10 is larger than a real one for convenience. The circle of the beam BM is just inscribed in one cell in FIG. 10 but may be larger than each cell.

Meanwhile, the screen has a rough surface. When laser light, which is coherent, is incident on the rough surface, scattering rays of the laser light reflected on the rough surface interfere with each other to form a random pattern as speckle. Speckle is produced depending on the surface profile of the rough surface and the incident angle of laser light.

The surface profile of the rough surface, which is the surface of the screen, never changes, and speckle therefore depends on the incident angle of the laser light. Accordingly, speckle changes when the incident angle of laser light changes.

The incoming light to the integrator 25 is sequentially projected onto different positions of the integrator 25, and the interference pattern of the laser light changes every predetermined period of time. Accordingly, the human's eyes cannot sense speckle, thus implementing reduction of speckle.

The rotation angle of the prism 542 from +12° to −12° and the rotation angle of the prism 543 from +12.825° to −12.825° in the first embodiment are shown by way of example. The angles at which the prisms 542 and 543 are rotated may be properly set based on the size of the integrator 25 and the size of the cells constituting the integrator 25.

The first embodiment employs the integrator 25, which includes the cells of the fly-eye lens on the both sides, for the purpose of miniaturization. However, the apparatus maybe configured to include two integrators.

Second Embodiment

Figure 11:
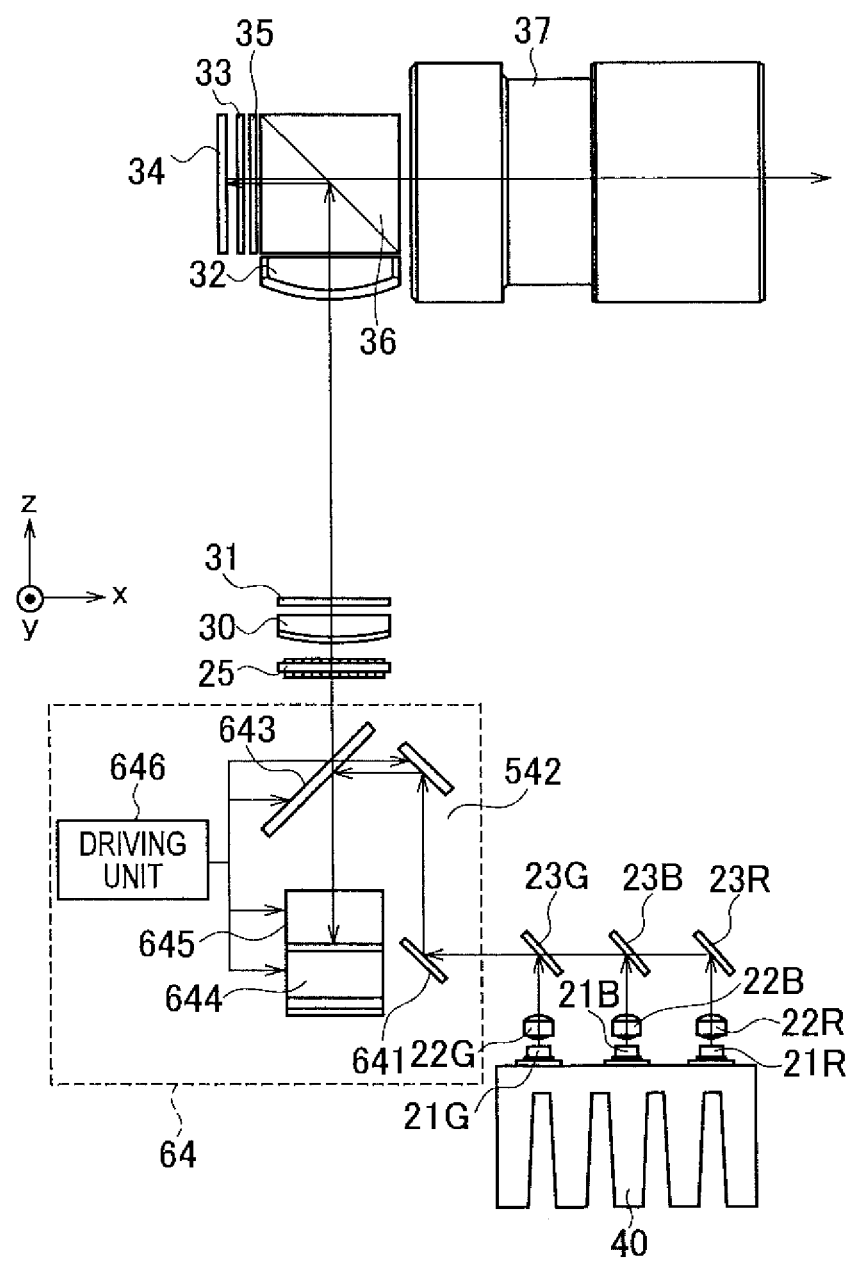
FIG. 11 is a configuration diagram illustrating a projection-type display apparatus of a second embodiment.

In a second embodiment illustrated in FIG. 11, the same portions as those of the first embodiment described in FIG. 1 are given the same reference numerals, and the description thereof is omitted. In FIG. 11, a beam irradiation position moving unit 64 including two pairs of mirrors is provided, instead of the beam irradiation position moving unit 54 of FIG. 1.

Figure 12:
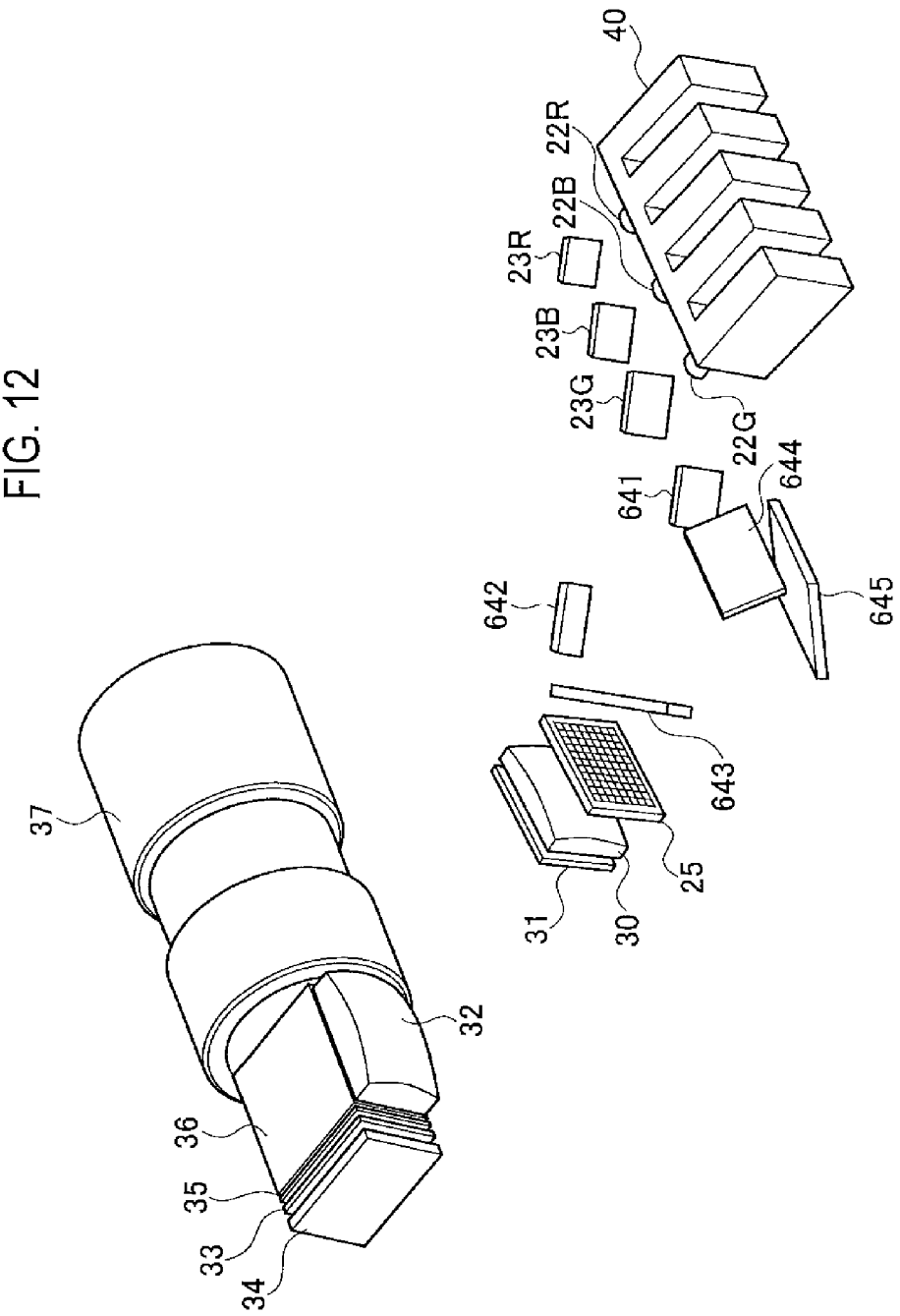
FIG. 12 is an isometric diagram of the second embodiment.

As illustrated in the plan view of FIG. 11 and the isometric diagram of FIG. 12, the beam irradiation position moving unit 64 includes: a mirror 641; mirrors 642 and 643 directly facing each other so that the directions thereof are orthogonal to each other; mirrors 644 and 645 similarly directly facing each other so that the directions thereof are orthogonal to each other; and a driving unit 646 driving the mirrors 642 to 645. FIG. 12 and FIGS. 13 to 19 described later do not show the driving unit 646.

In FIG. 11, the driving unit 646 drives all of the mirrors 642 to 645. However, the driving unit to drive the mirrors 642 and 643 may be separately provided from the driving unit to drive the mirrors 644 and 645, or the mirrors 642 to 645 may be individually driven by different driving units.

The operation of the beam irradiation position moving unit 64 is described using FIGS. 13 to 19. FIGS. 13 to 19 show a part of the configuration illustrated in FIGS. 11 and 12.

Figure 13:
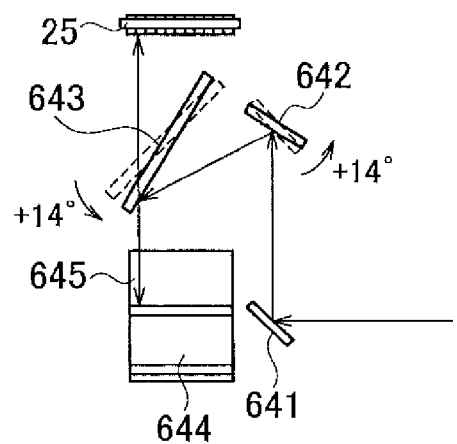
FIG. 13 is a plan view for explaining movement of mirrors 642 and 643 in FIGS. 11 and 12.

As illustrated in FIG. 13, the beam of the red, green, and blue light has the optical path thereof folded on the mirror 641 by 90° to be incident on the mirror 642. The mirrors 642 and 643 are rotated by +14° from the positions indicated by dashed lines. The beam of red, green, and blue light reflected on the mirror 642 is reflected on the mirror 643 and is then incident on the mirror 644.

In the state of FIG. 13, the beam of red, green, and blue light is incident on the left end of the mirror 644. The beam of red, green, and blue light reflected on the mirror 644 is reflected on the mirror 645 to be incident on the left end of the integrator 25 in the direction x.

As the mirrors 642 and 643 rotate at a same angular velocity in a same direction (counterclockwise), the beam of red, green, and blue light reflected on the mirror 645 sequentially moves toward the center of the integrator 25 in the direction x.

Figure 14:
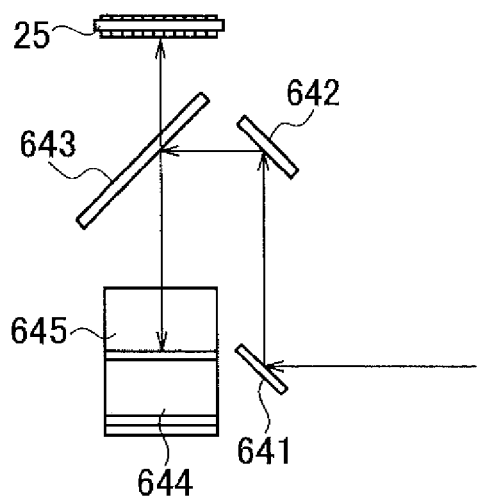
FIG. 14 is a plan view for explaining the movement of the mirrors 642 and 643 in FIGS. 11 and 12.

FIG. 14 shows the state where the mirrors 642 and 643 are returned to the reference positions of 0° (the position indicated by the dashed lines in FIG. 13). The beam of red, green, and blue light is incident on the center of the integrator 25 in the direction x.

As the mirrors 642 and 643 rotate clockwise from the reference positions, the beam of red, green, and blue light reflected on the mirror 645 sequentially moves from the center of the integrator 25 toward the right end in the direction x.

Figure 15:
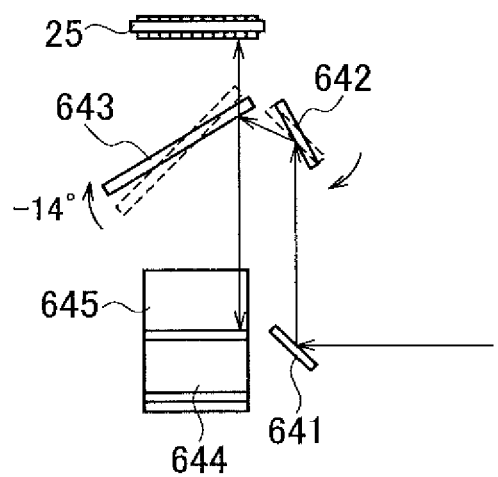
FIG. 15 is a plan view for explaining the movement of the mirrors 642 and 643 in FIGS. 11 and 12.

FIG. 15 shows a state where the mirrors 642 and 643 are rotated clockwise by 14° from the reference position indicated by the dashed lines. The beam of red, green, and blue light is incident on the right end of the integrator 25 in the direction x. As the mirrors 642 and 643 rotate in a reciprocating manner in a range from +14° to −14°, the beam of red, green, and blue light is projected onto a predetermined position of the integrator 25 in the direction y while reciprocating from the left to the right end in the direction x.

Figure 16:
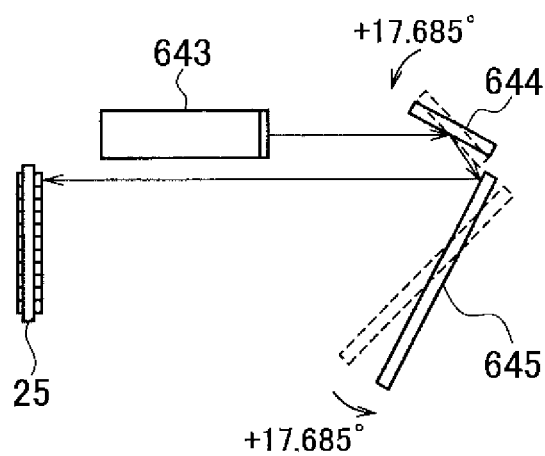
FIG. 16 is a plan view for explaining movement of mirrors 644 and 645 in FIGS. 11 and 12.

Next, FIG. 16 shows the state where the mirrors 644 and 645 are rotated counterclockwise by 17.685° from the positions indicated by the dashed lines to the positions indicated by the solid lines. In this state, the beam of red, green, and blue light reflected on the mirror 645 is incident on a cell of the first line located at the upper end of the integrator 25 in the direction y.

Figure 17:
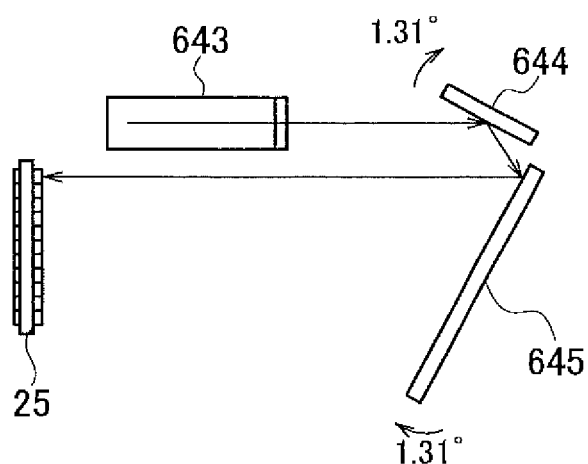
FIG. 17 is a plan view for explaining the movement of the mirrors 644 and 645 in FIGS. 11 and 12.

As illustrated in FIG. 17, when the angles of the mirrors 644 and 645 are returned by 1.31° from the positions illustrated in FIG. 16, the beam of red, green, and blue light is incident on a cell of the second line of the integrator 25.

As the angles of the mirrors 644 and 645 sequentially return in increments of 1.31°, the beam of red, green, and blue light sequentially moves from the cell of the first line of the integrator 25 in the direction y toward the cell at the lower end.

Figure 18:
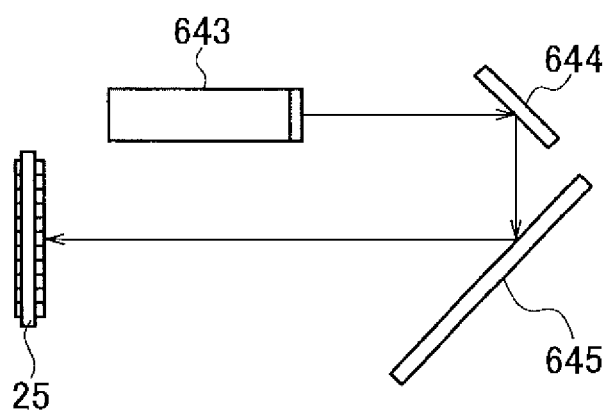
FIG. 18 is a plan view for explaining the movement of the mirrors 644 and 645 in FIGS. 11 and 12.

FIG. 18 shows the state where the mirrors 644 and 645 are rotated from +17.685° of FIG. 16 in increments of 1.31° for 13 times. In this state, the beam of red, green, and blue light is incident on the cell of the line just above the center of the integrator 25 in the direction y.

As the mirrors 644 and 645 further rotate in increments of 1.31°, the beam of red, green, and blue light reflected on the mirror 645 sequentially moves toward the cell located at the lower end of the integrator 25 in the direction y.

Figure 19:
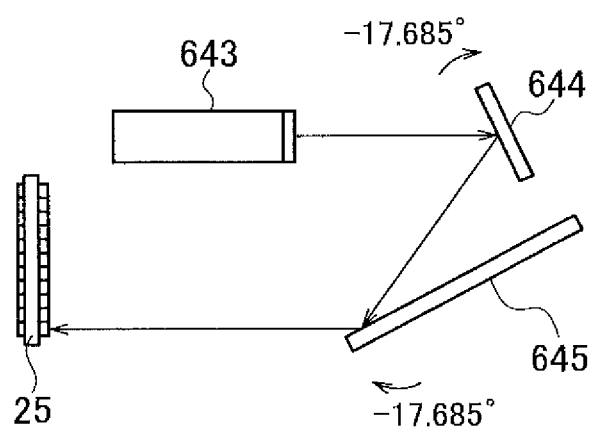
FIG. 19 is a plan view for explaining the movement of the mirrors 644 and 645 in FIGS. 11 and 12.

FIG. 19 shows the state where the mirrors 644 and 645 are rotated clockwise by +17.685° from the reference positions indicated by the dashed lines in FIG. 16. The beam of red, green, and blue light is incident on the lower end of the integrator 25 in the direction y.

When the mirrors 644 and 645 rotate in a reciprocating manner in a range from +17.685° to −17.685° as described above, the beam of red, green, and blue light is projected onto a predetermined position of the integrator 25 in the direction x while reciprocating from the upper end to the lower end in the direction y.

The driving unit 646 combines the above-described reciprocating rotation of the mirrors 642 and 643 in a range from +14° to −14° and reciprocating rotation of the mirrors 644 and 645 in a range from +17.685° to −17.685° in the following manner.

First, the driving unit 646 holds the mirrors 644 and 645 rotated by 17.685° in the state of FIG. 6 while rotating the mirrors 642 and 643 from +14° to −14°. The beam of red, green, and blue light is therefore sequentially projected onto the cells of the first line located at the upper end of the integrator 25 in the direction y from the left end to the right end in the direction x.

Subsequently, the driving unit 646 returns the angles of the mirrors 644 and 645 by 1.31° and holds the returned mirrors 644 and 645 while rotating the mirrors 642 and 643 from −14° to +14°. The beam of red, green, and blue light is then sequentially projected onto the cells of the second line of the integrator 25 from the right end to the left end in the direction x.

In a similar manner, by sequentially rotating the mirrors 644 and 645 in increments of 1.31° while rotating the mirrors 642 and 643 from +14° to −14° or from −14° to +14°, the beam of red, green, and blue light can be projected onto the cells of each line of the integrator 25 from the left end to the right end or from the right end to the left end.

By combining the continuous reciprocating rotation of the mirrors 642 and 643 and the rotation of the mirrors 644 and 645 by 1.31° as described above, the beam BM is caused to scan the integrator 25 in the horizontal and vertical directions as illustrated in FIG. 10 in a similar manner to the first embodiment.

The beam BM can be thereby sequentially projected onto all the cells of the integrator 25. Accordingly, speckle can be reduced also in the second embodiment.

The rotation angles of the mirrors 642 and 643 of +14° to −14° and the rotation angles of the mirrors 644 and 645 of +17.685° to −17.685° in the second embodiment are shown by way of example. The angles at which the mirrors 642 and 643 and mirrors 644 and 645 are rotated may be properly set based on the size of the integrator 25 or the size of the cells constituting the integrator 25.

In the second embodiment, the integrator 25 may be replaced with two integrators.

Third Embodiment

Figure 20:
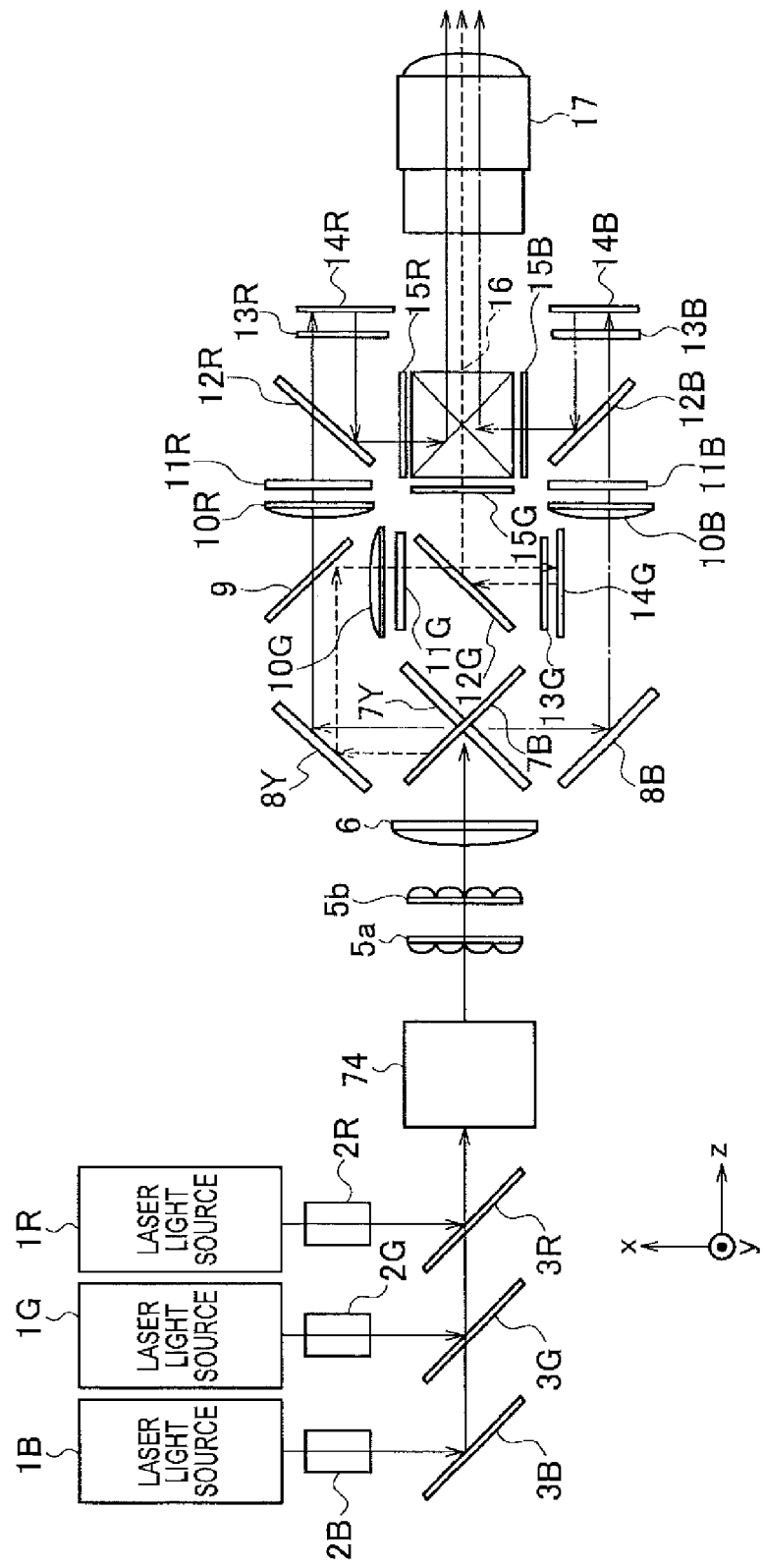
FIG. 20 is a configuration diagram illustrating a projection-type display apparatus of a third embodiment.

In FIG. 20, laser light sources 1R, 1G, and 1B, which are composed of laser diodes, emit red, green, and blue light, respectively. Beam expanders 2R, 2G, and 2B, which are composed of lenses, collimate the incident red, green, and blue light, respectively.

The beam expanders 2R, 2G, and 2B are substantially the same as the collimator lenses 22R, 22G, and 22B of the first and second embodiments, respectively.

A mirror 3B reflects the blue light emitted from the beam expander 2B to fold the optical path thereof by 90°. A dichroic mirror 3G reflects the green light emitted from the beam expander 2G to fold the optical path thereof by 90°, combines the blue and green light and emits the combined light.

A dichroic mirror 3R reflects the red light emitted from the beam expander 2R to fold the optical path thereof by 90° and combines and emits the red light and the blue and green combined light. The dichroic mirror 3R thereby emits three-primary color combined light including the red, green, and blue light combined.

The three-primary color combined light passes through the beam irradiation position moving unit 74 to be incident on an integrator 5a, which is composed of a fly-eye lens. The configuration and operation of the beam irradiation position moving unit 74 are described later. To the light emission side of the integrator 5a, an integrator 5b, which is composed of a fly-eye lens, is provided. Each of the integrators 5a and 5b has a form where a plurality of rectangular lens cells is arranged in the directions x and y.

The three-primary color combined light incident on individual cells of the integrator 5a is incident on each cell of the integrator 5b. The three-primary color combined light emitted from each cell of the integrator 5b is collected by a condenser lens 6 and is incident on dichroic mirrors 7Y and 7B.

The dichroic mirror 7Y separates a mixture of red and green light from the three-primary color combined light, and the dichroic mirror 7B separates blue light from the three-primary color combined light. In FIG. 20, the red light is indicated by solid lines, the green light is indicated by dashed lines, and the blue light is indicated by dashed-dotted lines in optical paths after the dichroic mirrors 7Y and 7B.

The mirror 8Y reflects the mixture of red and green light to fold the optical path thereof by 90°, and the mirror 8B reflects the blue light to fold the optical path thereof by 90°. The mixture of red and green light is incident on a dichroic mirror 9, and the blue light is incident on a field lens 10B.

The dichroic mirror 9 transmits the red light and reflects the green light to fold the optical path thereof by 90°. The red light transmitted through the dichroic mirror 9 is incident on a field lens 10R. The green light with the optical path folded by the dichroic mirror 9 is incident on a field lens 10G. The field lenses 10R, 10G, and 10B are collectively referred to as field lenses 10.

The red, green, and blue light emitted from the field lenses 10 passes through polarization plates 11R, 11G, and 11B, each serving as a polarizer, to be incident on wire grid-type polarization beam splitters (PBSs) 12R, 12G, and 12B, respectively.

Each of the PBSs 12R, 12G, and 12B transmits any one of a P-polarized component and a S-polarized component of the red, green, and blue light, only the P-polarized component, for example. The P-polarized components of the red, green, and blue light are transmitted through compensators 13R, 13G, and 13B, which control the polarization directions to compensate the angular characteristics, and are incident on reflective liquid crystal devices (modulation devices) 14R, 14G, and 14B. The reflective liquid crystal devices 14R, 14G, and 14B are collectively referred to as reflective liquid crystal devices 14.

The red, green, and blue light incident on the reflective liquid crystal devices 14 are respectively modulated in accordance with the red, green, and blue components of the image signal to be converted into S-polarized components.

The S-polarized components of the red, green, and blue light which are reflected on the reflective liquid crystal devices 14 to be emitted are transmitted through the compensators 13R, 13G, and 13B again to be incident on the PBSs 12R, 12G, and 12B, respectively. The PBSs 12R, 12G, and 12B reflect the S-polarized components of the red, green, and blue light to fold the optical paths thereof by 90°. The S-polarized components of the red, green, and blue light respectively pass through polarization plates 15R, 15G, and 15B, which serve as analyzers, and are incident on a cross-dichroic prism 16.

The cross-dichroic prism 16 combines the red, green, and blue light, and a projection lens 17 projects the combined light onto a not-shown screen.

Figure 21A:
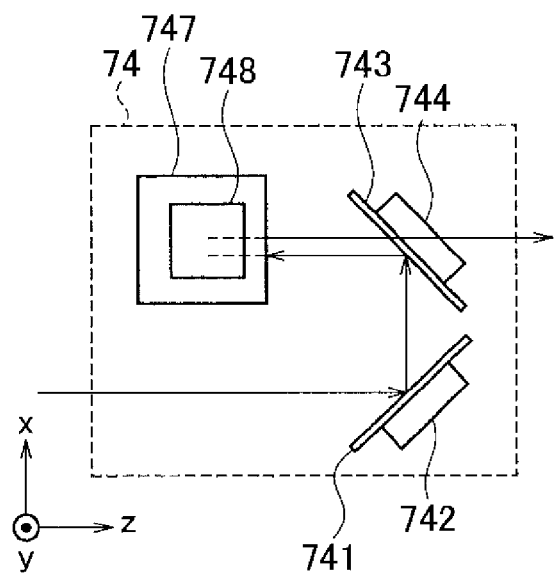
FIGS. 21A and 21B are plan views illustrating a specific configuration of a beam irradiation position moving unit 74 in the third embodiment.
Figure 21B:
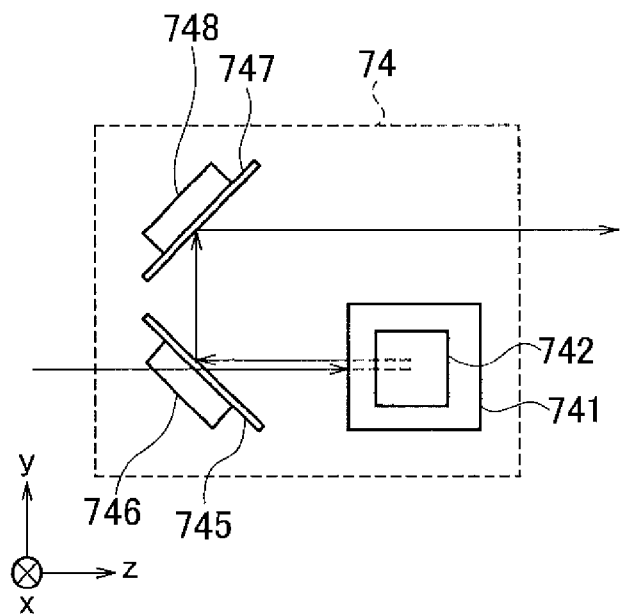

Next, using FIGS. 21A and 21B, a description is given of the operation of the beam irradiation position moving unit 74. As illustrated in FIGS. 21A and 21B, the beam irradiation position moving unit 74 includes mirrors 741, 743, 745, and 747.

On the back sides of the mirrors 741, 743, 745, and 747, driving units 742, 744, 746, and 748 to drive the mirrors 741, 743, 745, and 747 are attached, respectively. The driving units 742, 744, 746, and 748 are composed of moving coils, for example.

As illustrated in FIG. 21A, the mirrors 741 and 743 are positioned to face each other so that the directions thereof are orthogonal to each other in a similar manner to the second embodiment. The beam of the three-primary color combined light incident on the mirror 741 is reflected on the mirror 741 to be incident on the mirror 743.

As illustrated in FIG. 21B, the beam of the three-primary color combined light reflected on the mirror 743 is incident on the mirror 745 as illustrated in FIG. 21B. The mirrors 745 and 747 are positioned to face each other so that the directions thereof are orthogonal to each other in a similar manner to the second embodiment. The beam of the three-primary color combined light incident on the mirror 745 is reflected on the mirror 745 and is incident on the mirror 747. The beam of the three-primary color combined light reflected on the mirror 747 is projected onto the integrator 5a.

Similarly in the third embodiment, by rotating the mirrors 741 and 743 in a same direction and rotating the mirror 745 and 757 in a same direction, the beam BM of the three-primary color combined light can scan the integrator 5a in the horizontal and vertical directions as illustrated in FIG. 10. Speckle can be thereby reduced also in the third embodiment.

The angles at which the mirrors 741 to 747 are rotated may be properly set based on the size of the integrator 5a and the size of the cells constituting the integrator 5a.

The third embodiment may be configured to use a single integrator with cells formed on both sides in a similar manner to the integrator 25 of the first and second embodiments.

Fourth Embodiment

Figure 22:
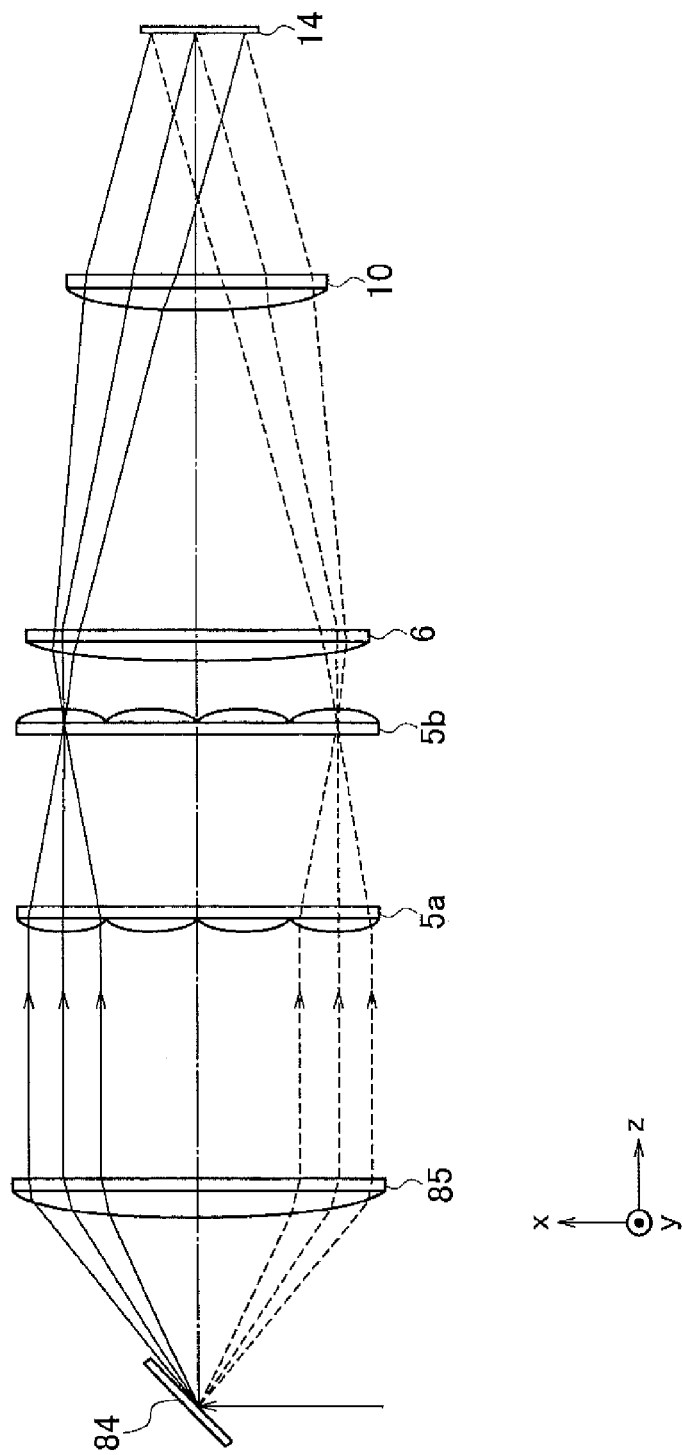
FIG. 22 is a configuration diagram illustrating a projection-type display apparatus of a fourth embodiment.

A fourth embodiment illustrated in FIG. 22 is configured to cause the beam BM to scan the integrator 5a in the horizontal and vertical direction using a MEMS (microelectromechanical system) device 84 instead of the beam irradiation position moving unit 74 of the third embodiment of FIG. 20. The MEMS device 84 operates as a beam irradiation position moving unit. FIG. 22 conceptually illustrates the configuration similar to FIG. 20 for simplification.

The MEMS device 84 causes the incident beam to scan the integrator 5a in the horizontal and vertical directions. The beam emitted from the MEMS device 84 is collected and collimated by the collimator lens 84 and is incident on the integrator 5a.

In FIG. 22, light emitted from one side of the collimator lens 85 in the direction x is indicated by solid lines, and light emitted from the other side in the direction x is indicated by dashed lines.

In the integrator illumination optical system including the integrators 5a and 5b, collimated light is incident on the entire surface of the integrator 5a. The light incident on the integrator 5a is transmitted sequentially through the integrator 5b, condenser lens 6, and field lens 10 and is incident on the reflective liquid crystal device 14 as telecentric beams.

Speckle can be reduced also in the fourth embodiment.

As described above, according to the projection-type display apparatus of each embodiment, it is possible to effectively reduce speckle produced by the high coherence of laser light sources.

The present invention is not limited by the embodiments described above and can be changed variously without departing from the spirit of the invention.

What is claimed is:

1. A projection-type display apparatus comprising;
   a laser source;
   an integrator which includes a plurality of rectangular lens cells arranged in a first direction and a second direction and is irradiated by laser light emitted from the laser source, the laser light incident on the integrator being a circular laser light, and the circular laser light being incident on one of the rectangular lens cells;
   a beam irradiation position moving unit configured to cause the laser light emitted from the laser light source to scan the surface of the integrator in the first and second directions, so that the circular laser light is sequentially projected onto every lens cell of the plurality of lens cells;
   a modulation device configured to modulate the laser light emitted from the integrator; and
   a projection lens configured to project the laser light modulated by the modulation device.

2. The projection-type display apparatus according to claim 1, wherein
   the beam irradiation position moving unit includes:
   a first prism configured to cause the laser light to scan in the first direction;
   a second prism configured to cause the laser light to scan in the second direction; and
   a driving unit configured to individually rotate the first and second prisms by predetermined angles in a reciprocating manner.

3. The projection-type display apparatus according to claim 1, wherein
the beam irradiation position moving unit includes:
a first pair of mirrors configured to cause the laser light to scan in the first direction;
a second pair of mirrors configured to cause the laser light to scan in the second direction; and
a driving unit configured to individually rotate the first and second pairs of mirrors by predetermined angles in a reciprocating manner.

* * * * *